(12) United States Patent
Bindal et al.

(10) Patent No.: US 12,711,181 B2
(45) Date of Patent: Aug. 18, 2026

(54) INTELLIGENT DOCUMENT PROCESSING IN ENTERPRISE RESOURCE PLANNING

(71) Applicant: SAP SE, Walldorf (DE)

(72) Inventors: Hitesh Bindal, Bengaluru (IN); Saurabh Saxena, Bengaluru (IN); Simona Marincei, Rauenberg (DE); Maciej Fuchs, Bratislava (SK); Sankara Narayanan Raja, Walldorf (DE)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 17/821,542

(22) Filed: Aug. 23, 2022

(65) Prior Publication Data

US 2024/0070570 A1 Feb. 29, 2024

(51) Int. Cl.

*G06F 16/93* (2019.01)
*G06Q 10/0631* (2023.01)
*G06Q 10/107* (2023.01)

(52) U.S. Cl.

CPC ......... *G06F 16/93* (2019.01); *G06Q 10/0631* (2013.01); *G06Q 10/107* (2013.01)

(58) Field of Classification Search

CPC ...... G06Q 20/14; G06Q 30/04; G06Q 10/107; G06Q 30/0633; G06F 16/93; G06F 17/40; G06F 40/174; G06F 40/279

See application file for complete search history.

(56) References Cited

U.S. PATENT DOCUMENTS

| | | | | |
|---|---|---|---|---|
| 9,953,070 | B1 * | 4/2018 | Hankins ................ | G06F 16/254 |
| 2010/0114561 | A1 * | 5/2010 | Yasin .................... | G06F 16/355 704/9 |
| 2013/0117287 | A1 * | 5/2013 | Jagota .................... | G06Q 10/06 707/755 |
| 2013/0300562 | A1 * | 11/2013 | Krasinskiy ............ | G06Q 10/06 340/540 |

(Continued)

OTHER PUBLICATIONS

Docparser.com [online], "Extract Data From PDF Purchase and Sales Orders" Feb. 2017, [retrieved on Jun. 13, 2022], retrieved from: URL <https://docparser.com/solutions/pdf-purchase-order-workflow-automation/>, 4 pages.

(Continued)

*Primary Examiner* — Rutao Wu
*Assistant Examiner* — Letoria G Knight
(74) *Attorney, Agent, or Firm* — Fish & Richardson P.C.

(57) ABSTRACT

The present disclosure involves systems, software, and computer implemented methods for intelligent document processing in enterprise resource planning. One example method includes automatically determining that a document file is ready to be processed in an ERP (Enterprise Resource Planning) system. The document file is automatically processed and a request is sent to the ERP system to automatically create or update ERP data in the ERP system based on the document file. Status information is received from the ERP system regarding the request to create or update ERP data in the ERP system. The status information received from the ERP system is logged and information indicating that the document file has been processed in the ERP system is automatically recorded.

20 Claims, 7 Drawing Sheets

(56) References Cited

U.S. PATENT DOCUMENTS

| | | | | |
|---|---|---|---|---|
| 2015/0081485 | A1* | 3/2015 | Angelovski | G06Q 40/12 705/30 |
| 2018/0349489 | A1* | 12/2018 | Toudji | G06F 16/313 |
| 2019/0251149 | A1* | 8/2019 | Moyers | G06N 5/01 |
| 2020/0005258 | A1* | 1/2020 | Miller | G06F 40/174 |
| 2020/0176098 | A1* | 6/2020 | Lucas | G16H 10/60 |
| 2020/0279200 | A1* | 9/2020 | Makhija | G06Q 10/0637 |
| 2021/0342723 | A1* | 11/2021 | Rao | G06Q 40/12 |
| 2021/0342901 | A1* | 11/2021 | Wang | G06Q 30/04 |
| 2021/0357633 | A1* | 11/2021 | Bade | G06F 40/284 |
| 2021/0374479 | A1* | 12/2021 | Zambetti, Jr. | G06N 20/00 |
| 2022/0108107 | A1 | 4/2022 | Sathi et al. | |
| 2022/0188885 | A1* | 6/2022 | Blackman | G06F 16/182 |
| 2022/0350814 | A1* | 11/2022 | Owen | G06F 16/35 |
| 2022/0391994 | A1* | 12/2022 | Cooksey | G06Q 40/03 |
| 2023/0036217 | A1* | 2/2023 | Dearth | G06F 16/164 |
| 2023/0052372 | A1* | 2/2023 | Wilson | G06Q 50/18 |

OTHER PUBLICATIONS

Kajrolkar et al., "Customer Order Processing using Robotic Process Automation." 2021 International Conference on Communication information and Computing Technology (ICCICT). IEEE, Jun. 2021, 3 pages [Abstract Only].

Wikipedia.org [online], "Enterprise Resource Planning" Apr. 6, 2021, [retrieved on Jun. 28, 2022], retrieved from: URL <https://en.wikipedia.org/wiki/Enterprise_resource_planning>, 22 pages.

YouTube.com [Online Video], "Document Automation | Purchase Order Process Automation in SAP Using IQ Bot" Published on Apr. 21, 2020, [retrieved on Jun. 13, 2022], retrieved from: URL <https://www.youtube.com/watch?v=EIQUDR6ZTGo>, 1 page [Abstract Only].

* cited by examiner

INTELLIGENT DOCUMENT PROCESSING IN ENTERPRISE RESOURCE PLANNING

TECHNICAL FIELD

The present disclosure relates to computer-implemented methods, software, and systems for intelligent document processing in enterprise resource planning.

BACKGROUND

An ERP (Enterprise Resource Planning) system can be used by an organization for integrated management of organizational processes. The ERP system can include a database that can store objects that are used in numerous, core processes of the organization. Some processes that can be managed by an ERP system include resource tracking, payroll, sales orders, purchase orders, and invoicing, to name a few examples.

SUMMARY

The present disclosure involves systems, software, and computer implemented methods for intelligent document processing in enterprise resource planning. An example method includes: automatically determining that a document file is ready to be processed in an ERP (Enterprise Resource Planning) system; automatically processing the document file in response to determining that the document file is ready to be processed in the ERP system; automatically sending a request to the ERP system to automatically create or update ERP data in the ERP system based on the document file; receiving status information from the ERP system regarding the request to create or update ERP data in the ERP system; logging the status information received from the ERP system; and automatically recording that the document file has been processed in the ERP system.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Intelligent document processing in enterprise resource planning can be used to automate various document processing tasks in an ERP system. Intelligent document processing in enterprise resource planning can use the newest technologies such as robotic process automation and AI (Artificial Intelligence) based services in any combination (e.g., direct integration or side by side with ERP) to provide solutions for document processing in ERP systems. The solution described herein includes a set of cooperating finely-grained automated bots enhanced with AI services or directly integrated AI based services through ERP native connectors that each perform a defined service and when used in conjunction provide intelligent automation of ERP functions. In addition to saving input and processing time and associated costs for the manual manipulation of each document into the ERP system, such automation, coupled with final human validation and approval of AI based data extraction, can prevent occurrences of errors from fully manual entry. Preventing errors can result in additional resource savings as compared to resource consumption from multiple activities including an erroneous entry, error detection, and error correction, for those errors that might be later discovered. Preventing errors can also prevent data inconsistencies and other technical problems that may arise when manually-introduced errors would not be detected. Automation can result in more efficient use of customer's resources as those resources are not used for repetitive, manual, administrative tasks but rather for more advanced and customer relevant tasks. Accordingly, end-to-end ERP intelligent document process automation can result in strategic, efficient use of processing, personnel, and network resources in an ERP environment. Further details and advantages of end-to-end ERP process automation are described below.

Figure 1:
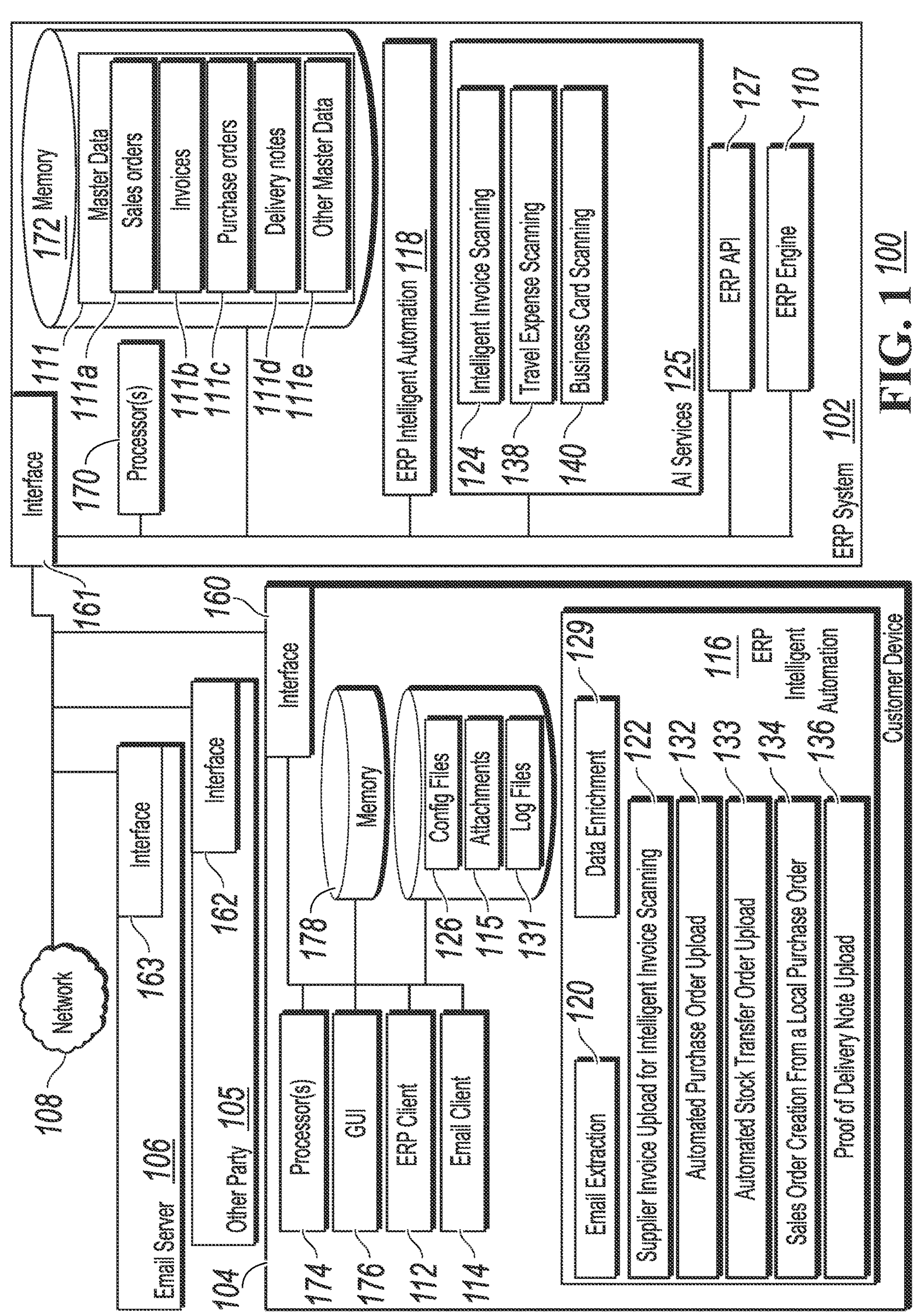
FIG. 1 is a block diagram illustrating an example system for intelligent document processing in enterprise resource planning.

FIG. 1 is a block diagram illustrating an example system 100 for intelligent document processing in enterprise resource planning. Specifically, the illustrated system 100 includes or is communicably coupled with an ERP system 102, a customer device 104, an other party system 105, an email server 106, and a network 108. Although shown separately, in some implementations, functionality of two or more systems or servers may be provided by a single system or server. In some implementations, the functionality of one illustrated system, server, or component may be provided by multiple systems, servers, or components, respectively.

Organizations, such as small and midsize enterprises (SMEs), large enterprises, or other types of organizations, can use the ERP system 102 for organizational process management. An ERP engine 110 can perform various ERP functions, for example financial planning, accounting, procurement, risk management and compliance, etc. The ERP engine 110 can perform these operations on various master data objects 111, such as sales orders 111*a*, invoices 111*b*, purchase orders 111*c*, delivery notes 111*d*, and other types of ERP objects or documents 111*e*. A SME or other organization can be a customer of the ERP system 102. The ERP system 102 can provide services for different customers, or tenants, of the ERP system 102. The customer device 104 can be used by a given user of a customer to access the ERP system 102. For example, the user can use an ERP client application 112 to initiate ERP actions and to send requests to the ERP system 102. The ERP client application 112 can be, for example, an installed application in an on-premise setting, a mobile application, or a web browser.

A customer user can, for example, use the ERP client application 112 to perform actions on master data objects 111 such as invoices 111*b*, purchase orders 111*c*, sales orders 111*a*, proof of deliveries (e.g., delivery notes 111*d*), and other types 11*e* of documents or objects, such as travel expenses, business partner objects, or other types of ERP data. For these and other types of documents, a customer user may receive the document attached from an email (e.g., in an email client application 114 from the other party system 105 via the email server 106) or from a 3rd Party system or application. The user may receive, for example, documents as email attachments from customers, vendors, suppliers, and other employees, or may take pictures or scans from existing paper documents (e.g., travel expenses, business cards, invoices). The user may wish for information in those documents to be extracted and input to the ERP system 102, so that the extracted information can be used in subsequent ERP processes performed by or in the ERP system 102. Before use of end-to-end ERP intelligent business document processing automation, a user would manually identify, sort/classify and then open each such document and perform monotonous, time-consuming manual tasks to enter data into the ERP client application 112 and submit requests for creation of corresponding objects or documents in the ERP system 102.

However, with end-to-end ERP intelligent business document process automation, an ERP intelligent automation engine 116 and an ERP intelligent automation engine 118 of the ERP system 102 can be used to automate various types of ERP functions. As one example (and as described in more detail below), instead of a user manually downloading, classifying, and saving supplier invoices from email messages and then typing invoice information into the ERP client application 112, an email extraction bot 120, a supplier invoice upload for intelligent invoice scanning bot 122, and an intelligent invoice scanning component 124 of an AI services engine 125 can be cooperatively used to automate handling of invoice information, using a mix of AI (Artificial Intelligence) services and robotic process automation integrated into the customer device 104 or the ERP system 102. For example, the supplier invoice upload for intelligent invoice scanning bot 122 can automatically upload supplier invoices to the ERP system 102 and the intelligent invoice scanning component 124 can automatically scan information from uploaded invoice files to create invoice objects **11*b* in the ERP system 102**.

In general, the ERP intelligent automation engine 116 includes a set of multiple cooperating bots that can be used in conjunction, with each bot performing a defined service. The bots in the ERP intelligent automation engine 116 can be adapted and customized to work with other types of ERP systems other than the ERP system 102 and/or other types of Email clients other than the Email client 114. Each bot can be configured using one or more configuration files 126. Once configured and triggered, each bot in the ERP intelligent automation engine 116 can run automatically without human intervention. Bots can be manually triggered or scheduled (e.g. independently for each user or a group of users) to automatically execute periodically, for example. By automating processing of information that may be received at the email client 114, the ERP intelligent automation engine 116 (and the ERP intelligent automation engine 118) can enable the email client 114 to be an extension of the ERP system 102 by performing multiple types of integration with the ERP system 102.

The bots can communicate with the ERP system 102 using either an ERP API (Application Programming Interface) 127 or the ERP client 112 emulating the user behavior. All the bots which need to process and extract information from documents can invoke a ML (Machine Learning) information extraction service available in the ERP intelligent automation engine 116, as described in more detail below. Bots may also use a data enrichment bot 129 to map extracted master data identifiers of master data 111 from the ERP system 102 and enrich the ML Service included in the ERP Intelligent Automation 116 for a higher information extraction accuracy. Bots can log automation results in log files 131. The log files 131 can indicate successful creation of ERP objects in the ERP system 102 and/or information for any failures that may occur as reported by return values provided by the ERP API 127. While specific types of bots are shown in the ERP automation collection 116, other types of bots can be used, and described bots can be used as best practice templates, for creation of other customized bots or bot extensions.

Figure 2:
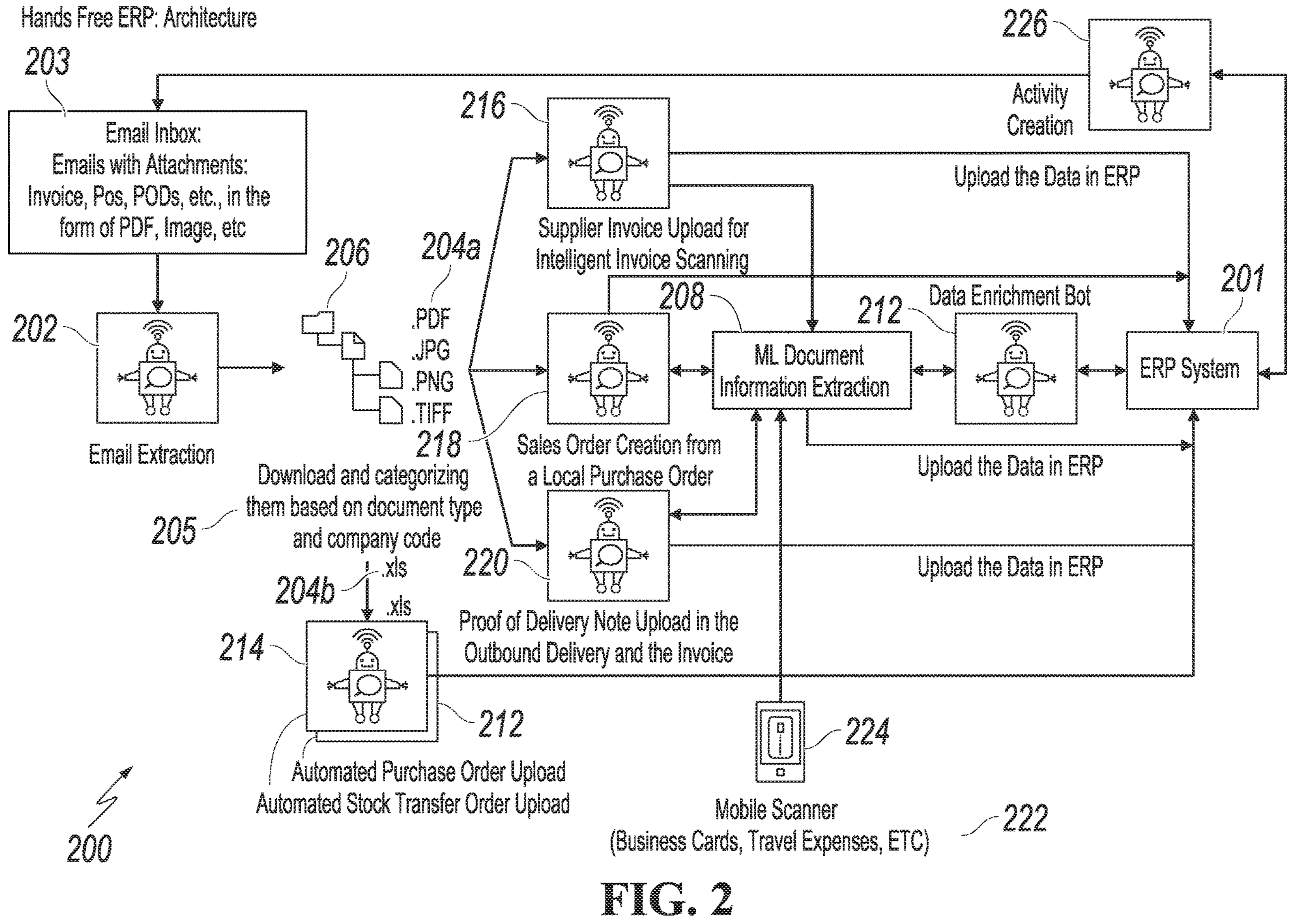
FIG. 2 illustrates an example system for intelligent document processing in enterprise resource planning.

In further detail, the email extraction bot 120 can automatically scan relevant email messages, download attachments 115 from the email messages, and categorize the attachments based, for example, on a document type and a company code. Company codes can be used to separate different legal entities, such as subsidiaries, with the ERP system 102, for example. The attachments 115 can be stored in specific folders, for access by other bots. For complex scenarios where traditional rule-based extractions may not suffice, the email extraction bot 120 can also be enhanced/customized with additional AI services such as document classification. Use of the email extraction bot 120 can result in reduced user effort, prevention of errors (resulting in higher levels of data consistency), and improved work efficiency. FIG. 2 below provides other details for the email extraction bot (and other bots in the ERP automation collection 116).

An automated purchase order upload bot 132 can be used for efficient purchase order creation. For example, the purchase order upload bot can automate the process of uploading purchase order information from a spreadsheet template to the ERP system 102 and creation of a purchase order in the ERP system 102. An automated stock transfer order bot 133 can perform similar functionality as the automated purchase order upload bot 132, but for stock transfer order information. A sales order creation from a local/customer purchase order bot 134 automates the process of creating a sales order from a local/customer purchase order. A proof of delivery upload bot 136 can automatically process a proof of delivery note and automatically send a request to the ERP system 102 to associate the proof of delivery note with an appropriate outbound delivery object and an invoice object in the ERP system 102. Further details of these bots and other details for end-to-end ERP automation are described below with respect to FIGS. 2-6. For example, bots can use other features of the AI services engine 125, such as travel expense scanning 138 and/or business card scanning 140.

As used in the present disclosure, the term "computer" is intended to encompass any suitable processing device. For example, although FIG. 1 illustrates a single ERP system 102, and a single customer device 104, the system 100 can be implemented using a single, stand-alone computing device, two or more ERP servers, or two or more client devices 104. Indeed, the ERP system 102 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the ERP system 102 and the customer device 104 may be adapted to execute any operating system, including Linux, UNIX, Windows, Mac OS®, Java™, Android™, iOS or any other suitable operating system. According to one implementation, the ERP system 102 may also include or be communicably coupled with an e-mail server, a Web server, a caching server, a streaming data server, and/or other suitable server.

Interfaces 160, 161, 162, and 163 are used by the customer device 104, the ERP system 102, the other party system 105, and the email server 106, respectively, for communicating with other systems in a distributed environment—including within the system 100—connected to the network 108. Generally, the interfaces 160, 161, 162, and 163 each comprise logic encoded in software and/or hardware in a suitable combination and operable to communicate with the network 108. More specifically, the interfaces 160, 161, 162, and 163 may each comprise software supporting one or more communication protocols associated with communications such that the network 108 or interface's hardware is operable to communicate physical signals within and outside of the illustrated system 100.

The ERP system 102 includes one or more processors 170. Each processor 170 may be a central processing unit (CPU), a blade, an application specific integrated circuit (ASIC), a field-programmable gate array (FPGA), or another suitable component. Generally, each processor 170 executes instructions and manipulates data to perform the operations of the ERP system 102. Specifically, each processor 170 executes the functionality required to receive and respond to requests from the customer device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The ERP system 102 includes memory 172. In some implementations, the ERP system 102 includes multiple memories. The memory 172 may include any type of memory or database module and may take the form of volatile and/or non-volatile memory including, without limitation, magnetic media, optical media, random access memory (RAM), read-only memory (ROM), removable media, or any other suitable local or remote memory component. The memory 172 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the ERP system 102.

The customer device 104 may generally be any computing device operable to connect to or communicate with the ERP system 102 via the network 108 using a wireline or wireless connection. In general, the customer device 104 comprises an electronic computer device operable to receive, transmit, process, and store any appropriate data associated with the system 100 of FIG. 1. The customer device 104 can include one or more client applications, including the ERP client application 112. A client application is any type of application that allows the customer device 104 to request and view content on the customer device 104. In some implementations, a client application can use parameters, metadata, and other information received at launch to access a particular set of data from the ERP system 102. In some instances, a client application may be an agent or client-side version of the one or more enterprise applications running on an enterprise server (not shown).

The customer device 104 further includes one or more processors 174. Each processor 174 included in the customer device 104 may be a central processing unit (CPU), an application specific integrated circuit (ASIC), a field-programmable gate array (FPGA), or another suitable component. Generally, each processor 174 included in the customer device 104 executes instructions and manipulates data to perform the operations of the customer device 104. Specifically, each processor 174 included in the customer device 104 executes the functionality required to send requests to the ERP system 102 and to receive and process responses from the ERP system 102.

The customer device 104 is generally intended to encompass any client computing device such as a laptop/notebook computer, wireless data port, smart phone, personal data assistant (PDA), tablet computing device, one or more processors within these devices, or any other suitable processing device. For example, the customer device 104 may comprise a computer that includes an input device, such as a keypad, touch screen, or other device that can accept user information, and an output device that conveys information associated with the operation of the ERP system 102, or the customer device 104 itself, including digital data, visual information, or a GUI 176.

The GUI 176 of the customer device 104 interfaces with at least a portion of the system 100 for any suitable purpose, including generating a visual representation of the ERP client application 112 and/or other applications. In particular, the GUI 176 may be used to view and navigate various Web pages, or other user interfaces. Generally, the GUI 176 provides the user with an efficient and user-friendly presentation of business data provided by or communicated within the system. The GUI 176 may comprise a plurality of customizable frames or views having interactive fields, pull-down lists, and buttons operated by the user. The GUI 176 contemplates any suitable graphical user interface, such as a combination of a generic web browser, intelligent engine, and command line interface (CLI) that processes information and efficiently presents the results to the user visually.

Memory 178 included in the customer device 104 may include any memory or database module and may take the form of volatile or non-volatile memory including, without limitation, magnetic media, optical media, random access memory (RAM), read-only memory (ROM), removable media, or any other suitable local or remote memory component. The memory 178 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the customer device 104.

There may be any number of customer devices 104 associated with, or external to, the system 100. For example, while the illustrated system 100 includes one customer device 104, alternative implementations of the system 100 may include multiple customer devices 104 communicably coupled to the ERP system 102 and/or the network 108, or any other number suitable to the purposes of the system 100. Additionally, there may also be one or more additional customer devices 104 external to the illustrated portion of system 100 that are capable of interacting with the system 100 via the network 108. Further, the term "client", "client device" and "user" may be used interchangeably as appropriate without departing from the scope of this disclosure. Moreover, while the customer device 104 is described in terms of being used by a single user, this disclosure contemplates that many users may use one computer, or that one user may use multiple computers.

FIG. 2 illustrates an example system 200 for intelligent document processing in enterprise resource planning. As described above, companies may receive many documents in email messages from vendors and customers. Example types of documents can include local purchase order, signed proof of delivery, payment advice, invoices, and other types of documents. Before or without end-to-end ERP intelligent business document process automation, users would manually scan through email messages, download attached documents or take pictures of paper based documents and then manually open and process each document including categorizing the downloaded documents (e.g., based on a document type and a company code) and extract information from the documents for manual entry in an ERP client application for submitting requests to create or update documents or objects in an ERP system 201. The manual process consumes a significant amount of a user's daily time and the process may be error prone. For example, the user may miss processing of an attachment, mis-categorize a document, enter incorrect information, etc., which can introduce data and legal risks for the company.

In contrast, an email extraction bot 202 (which can be the email extraction bot 120) can automatically scan relevant email messages from an email inbox 203 and download attachments of those email messages. The email extraction bot 202 can identify and extract files of different formats (e.g., example format types 204*a* and/or 204*b*) from email messages. As indicated by a note 205, the email extraction bot 202 can automatically download and categorize email attachments based on whatever combination of email rules the user defines and then categorize the attachments by document type and company code. For example, the email extraction bot 202 can place extracted attachments into a particular local folder structure 206, organized by document type and company code. As described below, other bots can retrieve attachments from the local folder structure 206 for further automated processing of the extracted attachments.

Before being used, the email extraction bot 202 can be configured. For example, configuration settings can specify which email account(s) to process and how to access the email account(s). Configuration settings can also include rules that specify criteria for identifying emails and attachments to extract. Rules can be defined for a given document type and company code. Rule criteria can include sender, subject, recipient, and filing naming patterns or values. Other rules can specify whether only unread email messages should be processed. Like all other bots described herein, the email extraction bot 202 is enabled for customer customization in that customers may modify and use the bot to extract documents from any other 3rd party system or enhance the bot with additional AI services such as document classification which may be used to replace a rule based document classification with AI based document classification.

Additionally, automatic triggering of the email extraction bot 202 can be configured to schedule the email extraction bot 202 to run in an unattended mode. For instance, automatic trigger configuration information can include specification of a location of a configuration file for the email extraction bot 202, frequency scheduling information, and credential information for a technical user on behalf of which execution will be performed. For example, specific technical users can be defined and used for automation bots so that actions performed by automation bots can be later distinguished from actions taken by human users. Although the email extraction bot 202 is described as automatically scheduled, it is also possible for a human user to manually execute the email extraction bot 202.

In response to being executed, the email extraction bot 202 can connect to a specified email account, open and read a specified configuration file, and evaluate and process each rule included in the configuration file. Execution of each rule may result in identification of one or more email messages or attachments that match the rule, and extraction of each attachment that matches a message or attachment criterion. The email extraction bot 202 can place extracted attachments into the local folder structure 206. For example, the email extraction bot 202 can place an extracted attachment in a to-be-processed sub folder underneath a document-type/company code sub tree in the local folder structure 206. The to-be-processed sub folder can hold email attachments that will be later processed by other bots. The email extraction bot 202 can create appropriate portions of the local folder structure 206 as needed. Additionally, the email extraction bot 202 can move processed email messages to a specified folder of an email client application. For instance, processed email messages can be moved to a "processed" folder of the email client application. The email extraction bot 202 can create and maintain a log file that logs information regarding processed email messages and extracted attachments.

As mentioned, other bots can pick up documents that have been placed into the local folder structure 206 and automatically process the documents. Some bots may retrieve the document and then invoke an API of the ERP system 201 to upload the document to a particular location or repository in the ERP system 201, associating the document with one or more existing objects in the ERP system 201. In order to do this association and determine in which existing object to upload the document, a bot can invoke the ML (Machine Learning) document information extraction service 208, which can extract and identify the exact information which will be used by the bot to be passed to the ERP System 201 for the correct business object identification. Other bots may extract information from a document using the ML (Machine Learning) document information extraction service 208, then invoke an API of the ERP system 201 to request creation of one or more objects in the ERP system 201 using the data extracted and classified from the document with the help of the ML (Machine Learning) document information extraction service 208. In these examples, bots can also upload a document after the creation of the new object in the ERP System 201; Some bots may also use a data enrichment bot 210 to map the extracted master data from the ERP system 201 to the ML (Machine Learning) document information extraction service 208 in order to increase the accuracy of the data extraction and recognition from the scanned documents. As with the email extraction bot 202, bots can be configured to be automatically triggered, such as on a schedule. Although bots can process a document placed into the local folder structure 206 by the email extraction bot 202, a user can also manually place a document into a specified folder and then manually run a bot that retrieves and processes the document.

The system 200 can support various types of bots. Example bots shown include an automated purchase order upload bot 212, an automated stock transfer order upload bot 214, a supplier invoice upload for intelligent invoice scanning bot 216, a sales order creation from a local purchase order bot 218, and a proof of delivery note upload bot 220. Other bots can be included or created by a customer. For example, a customer can download content for a bot, and use the content as a customizable template by customizing and extending the bot content to create a custom bot.

The automated purchase order upload bot 212 can be used for efficient purchase order creation. Efficient purchase order creation can be a key objective of companies to reduce and streamline repetitive purchase order tasks. A user can use a spreadsheet template for convenient entry of purchase order information. The spreadsheet template can include populated fields of purchase order headers and line items.

The user can send the spreadsheet template to themselves (or to another user) as an email message attachment. The email extraction bot 202 can automatically extract the spreadsheet template from a recipient's email message and place the spreadsheet template in a specified folder configured for the automated purchase order upload bot 212, based on a configured rule for a document type of purchase order creation from a spreadsheet template, for example.

The automated purchase order upload bot 212 can be configured to automatically retrieve and process a spreadsheet template. Configuration information for the automated purchase order upload bot 212 can include a directory for spreadsheet templates, a tenant URL (Uniform Resource Locator) for the ERP system 201, and credential information for a technical user that the automated purchase order upload bot 212 can use to log in to the ERP system 201.

The automated purchase order upload bot 212 can retrieve the spreadsheet template, read the information provided in the template, and use the data read from the template to create a purchase order document in the ERP system 201 by invoking one or more APIs of the ERP system 201. The ERP system 201 can create a purchase order object using information provided in the API call(s). Upon successful creation of the purchase order object, the purchase order object can include information in purchase order object fields that maps to corresponding fields in the spreadsheet template. The automated purchase order upload bot 212 can create a log file that documents either creation of the purchase order or error information if a purchase order could not be created. The automated purchase order upload bot 212 can move a processed spreadsheet template to a "processed" sub folder in the local folder structure 206.

Use of the automated purchase order upload bot 212 can result in reduced user effort by automation of repetitive tasks. Purchase order creation can be streamlined and maintenance and processing of purchase order spreadsheet templates can be simplified. Additionally, the automated purchase order upload bot 212 can avoid limitations that may exist in the ERP system 201. For example, the ERP system 201 may support upload and processing of a spreadsheet template but may limit a number of fields, for example. The automated purchase order bot 212 can handle a spreadsheet template without such limitations, along with automated processing of the spreadsheet template.

The automated stock transfer order upload bot 214 can perform similar functionality as the automated purchase order upload bot 212, but for stock transfer order information. For example, the automated stock transfer order upload bot 214 can retrieve, from a specified folder, a stock transfer order spreadsheet template that was either manually or automatically placed into the specified folder. The stock transfer order spreadsheet template can include stock transfer requirements or information that has been determined by a user and/or by or using external sources or algorithms. Automatic processing of a manual or automatically-generated stock transfer order spreadsheet template can create a more streamlined, efficient, and more accurate stock transfer order process as compared to manual entry of stock transfer order information into the ERP system 201 using a stock transfer creation user interface of the ERP system 201.

The automated stock transfer order upload bot 214 can read information from the stock transfer order spreadsheet template. For example, the template can include fields for stock transfer order headers and line items. The automated stock transfer order upload bot 214 can use the information read from the template to create and invoke API calls of the ERP system 201 for requesting creation of stock transfer orders in the ERP system 201. Stock transfer orders automatically created in the ERP system 201 can have fields and field values that correspond to fields of the spreadsheet template. The automated stock transfer order upload bot 214 can create a log file documenting success and/or failure of stock transfer order creation and can move a processed spreadsheet template to a processed folder upon completion of the automated processing of the template.

The automated stock transfer order upload bot 214 can reduce user effort by automation of repetitive stock transfer order tasks. The automated stock transfer order upload bot 214 can simplify stock transfer order creation, including mass stock transfer order creation. The automated stock transfer order upload bot 214 can retrieve and process multiple stock transfer order spreadsheet template files, for example. A streamlined and more accurate stock transfer order process can be important, because management of inventory levels across different sites and warehouses of a company can be a key task that importantly ensures high delivery performance and the availability of production components and/or spare parts.

The sales order creation from a local purchase order bot 218 automates the process of creating a sales order from a local purchase order. Local purchase orders may be received from customers of an entity, for example, as email attachments. Manually finding and opening relevant purchase order email messages, manually downloading and opening an attachment, and manually creating a sales order from the purchase order by typing in each individual header and line item field from the document are resource-intensive and potentially error-prone processes. For example, the user may need to manually find field information in a purchase order and then manually enter corresponding information into a sales order using a sales order user interface of the ERP system 201. Manual processes can be prone to cause incorrect or missing information in created sales orders. In contrast, the sales order creation from a local purchase order bot 218 can automate relevant manual sales order creation tasks by automatically creating a draft sales order for the entity in the ERP system 201 and the sale representative will only need to review it and approve it saving up to 90% of the manually processing time. The sales order creation from a local purchase order bot 218 can thereby increase efficiency and speed of sales order creation, reduce amount and risk of manual errors, increase accuracy, and reduce overall effort by automation of repetitive tasks.

In further detail, purchase order email attachments can be automatically extracted from email messages by the email extraction bot 202 into a company code folder of the local folder structure 206. After the email extraction bot 202 has extracted a purchase order document into the local folder structure 206, the sales order creation from a local purchase order bot 218 can retrieve the purchase order document and provide the purchase order document to the ML document information extraction service 208. The ML document information extraction service 208 can be used to automate the identification and extraction of relevant information from different types of documents. The ML document information extraction service 208 can accept an unstructured document file as input (.PDF, .JPEG, .TIFF, etc.) and can return header fields and line items as structured data, such as queryable JSON (JavaScript Object Notation) data. The ML document information extraction service 208 can be an AI (Artificial Intelligence) service provided by the ERP system 201, by the robotic automation platform or a standalone service that uses one or more pre-trained ML models or customer defined templates.

The ML document information extraction service 208 can augment extracted data with master data from the ERP system 201 by using master data information provided by the data enrichment bot 210. The data enrichment bot 210 can periodically run, for example, to enrich the ML document information extraction service 208 with master data information (e.g., customer identifiers, product identifiers, etc.) from the ERP system 201 corresponding to non-master data (e.g., customer names, product names, etc.). The enriching can help the ML document information extraction service 208 to make more accurate proposals for the existing ERP master data matching through a fuzzy search instead of a simple query search. For example, the ML document information extraction service 208 can return, to the sales order creation from a local purchase order bot 218, a customer identifier based not only on the corresponding customer name, but also based on a bank account, tax identifier, address, or any other information included in a scanned purchase order document.

After receiving purchase order information (and corresponding master data information) from the ML document information extraction service 208, the sales order creation from a local purchase order bot 218 can include the received information in a request sent to the ERP system 201 for creation of a sales order in the ERP system 201. The ERP system 201 can create a draft sales order in the ERP system 201 in response to the request. The created sales order can have an initial status of "in preparation", meaning that the sales order is in a waiting state waiting for a sales representative to validate and approve its content. Additionally, a description field of the sales order can indicate that the sales order was created by the sales order creation from a local purchase order bot 218, insuring auditability and traceability in the ERP System 201.

As the purpose of the bot is to maximize the document processing time savings, such as in cases where not all the information was properly identified, the bot can be configured to provided alternatives which will still allow the input of all available information instead of dropping the document creation. For example, if a customer identifier was not identified for a scanned customer name, a configuration file setting can control whether the sales order creation from a local purchase order bot 218 still sends a request to the ERP system 201 to create a sales order (e.g., with a to-be-determined customer identifier). As another example, if a product identifier was not identified for a product name, a configuration file setting can control whether a free-text product (e.g., a product unmapped to a product identifier) is included in a sales order request sent to the ERP system 201. The sales order creation from a local purchase order bot 218 can also upload the purchase order document itself to the ERP system 201. As with other bots, the sales order creation from a local purchase order bot 218 can: 1) create a log file that documents successful sales order creation (or failure) status information; and 2) move a processed purchase order document to a processed sub folder of a company code folder in the local folder structure 206.

The proof of delivery note upload bot 220 can automatically process a proof of delivery note. Proof of delivery (POD) notes are acknowledgments from customers of an entity that goods have been received by the customer. For example, a delivery person can send a scanned copy of a delivery note to the entity as an attachment to an email message. Manual opening of such emails, opening of attachments, manually determining which outbound delivery or invoice is appropriate for the delivery note, and manually uploading the delivery note and associating the note with appropriate objects can be a resource-intensive, time-consuming and potentially error-prone process.

To replace such error-prone, resource-consuming proof of delivery note processes, the proof of delivery note upload bot 220 can automatically read a delivery note document, automatically extract a delivery note number from the delivery note with the help of the ML (Machine Learning) document information extraction service 208, and automatically upload the delivery note document to the ERP system 201 for association with (e.g., as an attachment to) to an outbound delivery object in the ERP system 201 that corresponds to the extracted delivery note number and to a corresponding invoice stored in the ERP system.

In further detail, the proof of delivery note upload bot 220 can detect a delivery note to process in a particular folder of the local folder structure. For example, the proof of delivery note upload bot 220 can detect a delivery note that has been extracted from an email message by the email extraction bot 202. The proof of delivery note upload bot 220 can send the delivery note to the ML document information extraction service 208 so that the ML document information extraction service 208 can automatically determine a delivery note number included in the delivery note. The proof of delivery note upload bot 220 can then call an API of the ERP system 201 to upload the delivery note to the ERP system 201 and associate the delivery note with appropriate outbound delivery and invoice objects. A comment, such as "uploaded by bot" can be added to a notes section of the outbound delivery object to insure the traceability and auditability of the process. As with other bots, the proof of delivery note upload bot 220 can log results of automated actions and can move a processed delivery note to a processed folder or a failed folder of the local folder structure 206, as appropriate.

The supplier invoice upload for intelligent invoice scanning bot 216 can automatically upload supplier invoices (such as invoices that the email extraction bot 202 has automatically extracted from emails) to the ERP system 201, for storage in the ERP system 201 by company code, for example. The ERP system 201 can include a component, such as an intelligent invoice scanning component, that can automatically scan information from uploaded invoice files to create invoice objects in the ERP system 201, for example. As with other bots, the supplier invoice upload for intelligent invoice scanning bot 216 can log results of automated actions and can move a processed invoice to a processed folder or a failed folder of the local folder structure 206, as appropriate.

As with other bots, the supplier invoice upload for intelligent invoice scanning bot 216 can reduce errors and streamline processes. Additionally, the supplier invoice upload for intelligent invoice scanning bot 216 can upload invoices for different companies (e.g., different company codes), which can solve a limitation that may exist for manual operations since a human user may belong to a single company code. Depending on whether the ERP System 201 includes already an intelligent invoice scanning engine based on ML (Machine Learning) document information extraction service 208, the bot 216 can either pass the uploaded document directly to the ERP System 201 for integrated processing or sent it to the external ML (Machine Learning) document information extraction service 208 for information extraction, retrieve back the scanned values and only then connect to the ERP System 201 for the creation of the draft invoice object. Depending on which ERP system the customer is using, a difference between an integrated intelligent invoice scanning within the ERP system or a side by side implementation can be a tradeoff between an integrated user experience and flexibility and costs. The intelligent invoice scanning bot 216 can provide flexibility to support both approaches.

The system 200 can support other kinds of end-to-end ERP automation. For example, a customer can use a mobile scanner application 222 running on a mobile device 224 to scan information, for example, from business cards, receipts, or other documents. The mobile scanner application 222 can take a picture of the desired document and submit the obtained photo to the ML (Machine Learning) document information extraction service 208 which can convert the unstructured document in a structured information to be passed to the ERP system 201, for creation or modification of object(s) in the ERP system 201 using the scanned information. For example, supported scenarios can include taking a picture from a travel receipt and adding it as a line item in the travel expense report within the ERP system or taking a picture from a business card received at an event and using it to create a new contact or a new lead in the ERP system.

A follow up activity automated through a bot is the activity creation bot 226 that can automatically create activities for a user in the email inbox 203 as well as in the ERP system 201, based on a new lead creation in the ERP system 201. For example, a user may create business partner leads in the ERP system 201 (or a business partner lead may be automatically created in the ERP system 201 in response to receiving business card information from the mobile scanner application 222). In response to determining that a new business lead has been created in the ERP system 201, the activity creation bot 226 can automatically create calendar reminders for the user that can automatically appear both in the ERP system 201 and in the email inbox 203, reminding the user to follow-up with the business lead.

Figure 3:
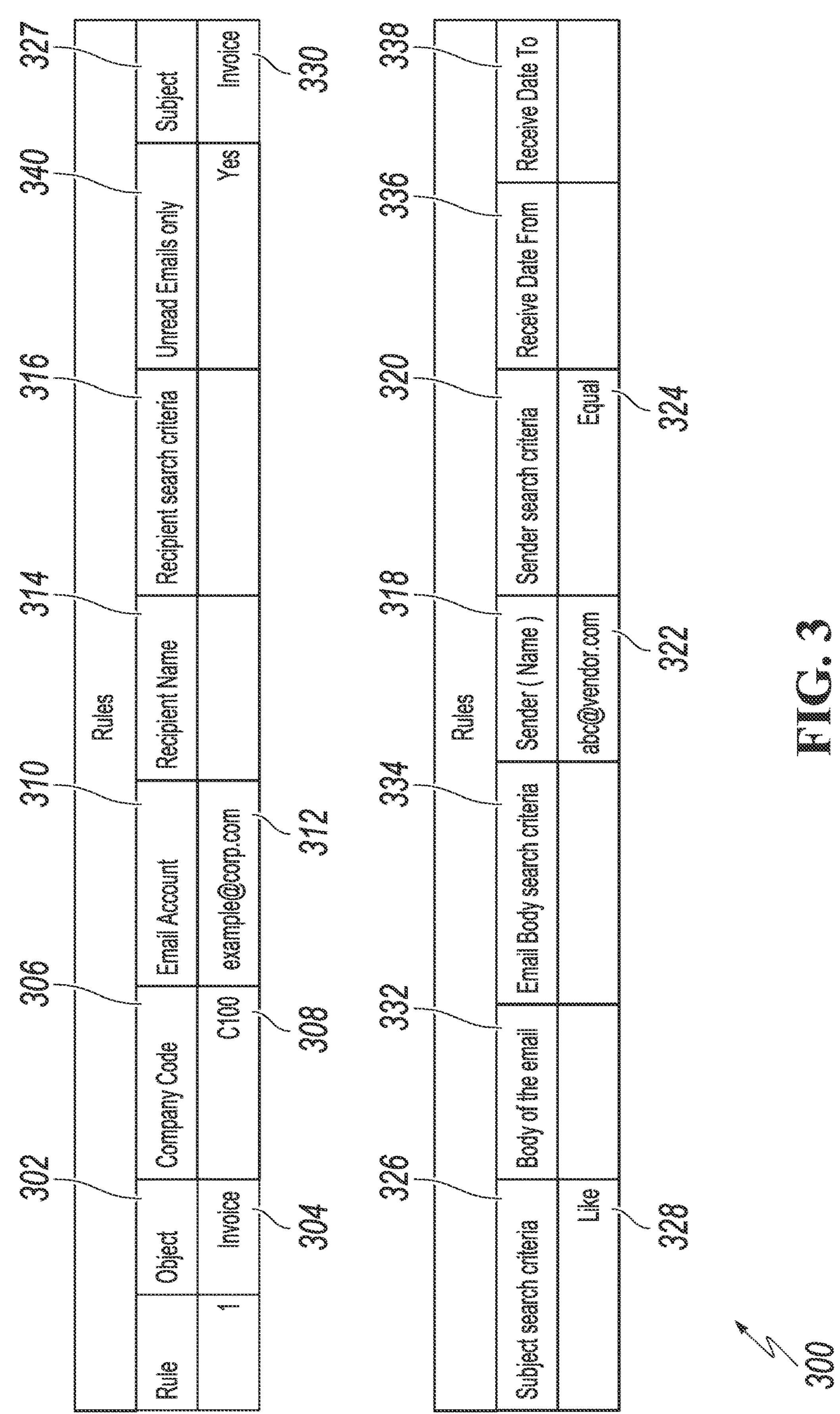
FIG. 3 illustrates an example configuration file.

FIG. 3 illustrates an example configuration file 300. The configuration file 300 can be used by the email extraction bot 120 and/or the email extraction bot 202. The configuration file 300 includes an object setting 302 that can specify to which object types (or files of certain object types) the other settings in the configuration file 300 apply. For instance, the object setting 302 has a value 304 of “invoice”. A company code setting 306 specifies a company code for which the settings apply. For instance, the company code setting 306 has a value 308 of “C100”.

An email account setting 310 specifies an email account to be processed by the email extraction bot. For example, the email account setting 310 has a value 312 of example@corp.com. A recipient name setting 314 and recipient search criteria 316 can be used to select emails to process by recipient information, if respective values are provided for those settings. Similarly, a sender name setting 318 and sender search criteria 320 can be used to select emails to process by sender information. For example, the sender name setting 318 has a value 322 of abc@vendor.com and the sender search criteria 322 has a value 324 of “equal”.

A value of “equal” (e.g., for the sender search criteria 320, the recipient search criteria 316, or other settings), can indicate that selection occurs in response to an exact match. A value of “like” can indicate that selection occurs in response to a partial match. For example, a subject search criteria 326, which applies to a subject setting 327, has a value 328 of “like”, which indicates that an email can be selected for processing if an “invoice” value 330 for the subject setting 327 is included in the subject of the email message. An email body setting 332 and email body search criteria 334 can be used to configure selections of emails based on email body content.

The configuration file 300 also includes a receive-date-from setting 336 and a receive-date-to setting 338 that can be used to select emails by receipt date range. A unread-emails-only setting 340 can be used to control whether only unread emails or both read and unread emails are processed.

Figure 4A:
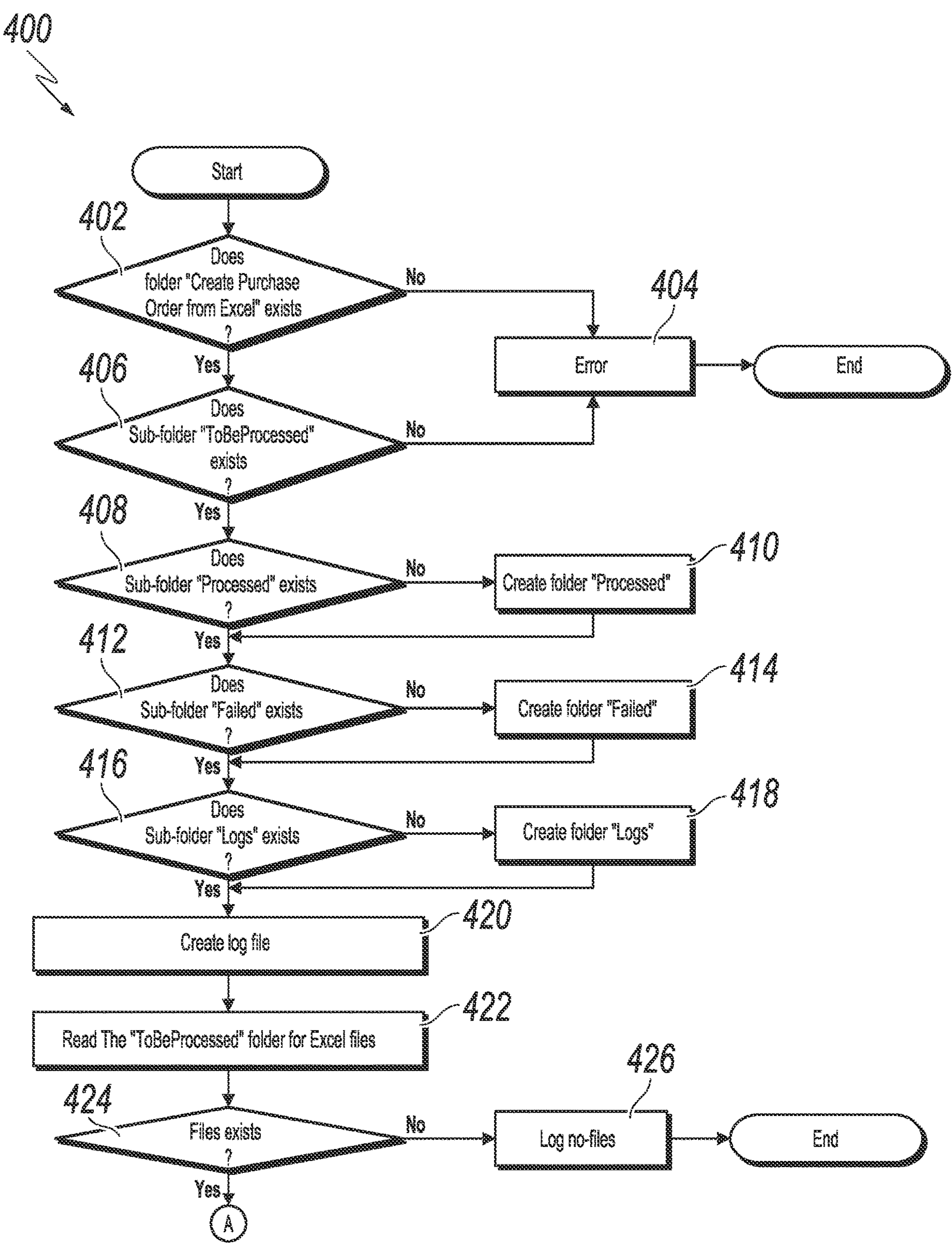
FIGS. 4A-4B illustrate an example method that can be performed by an automated purchase order update bot.
Figure 4B:
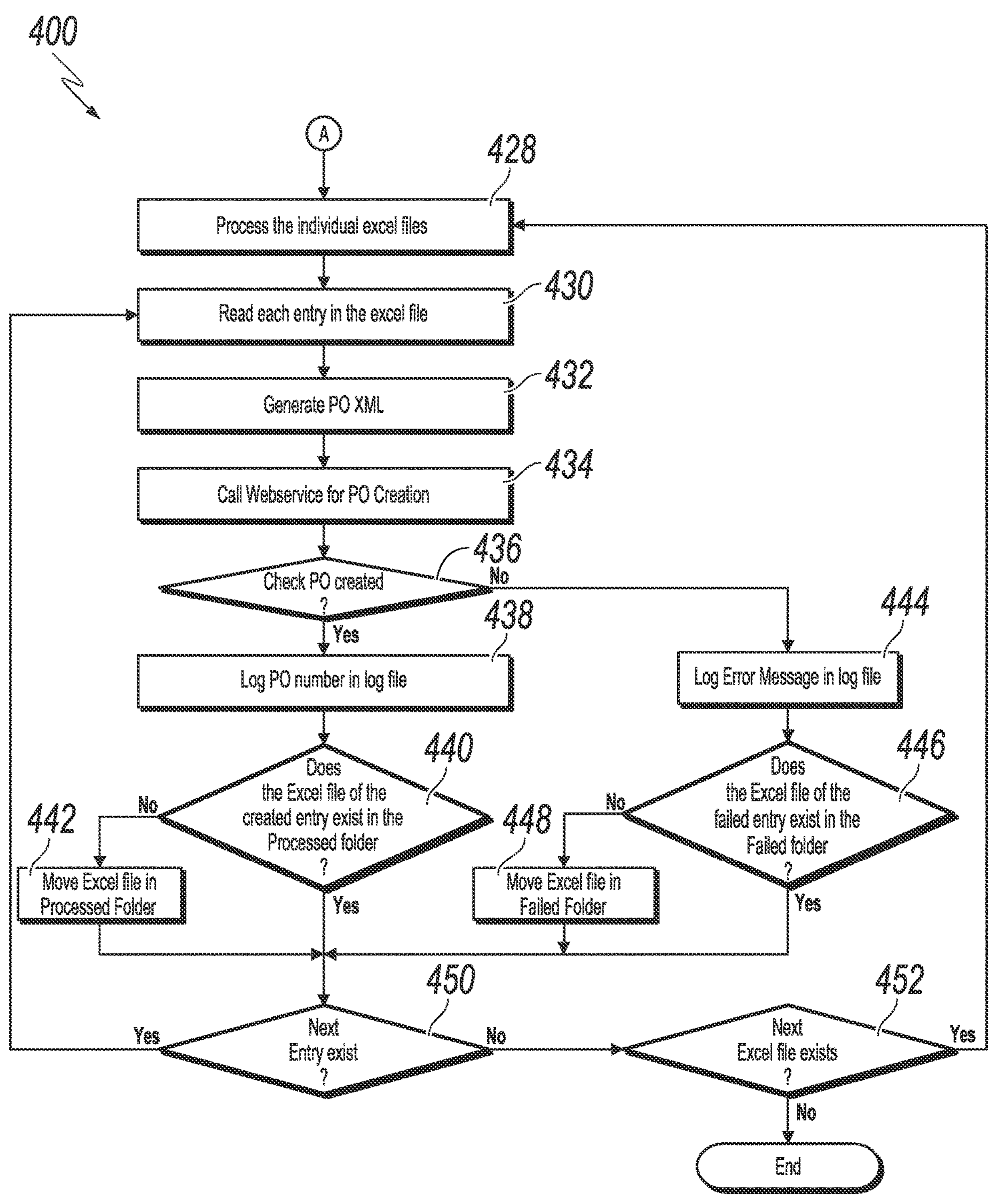

FIGS. 4A-4B illustrate an example method 400 that can be performed by the automated purchase order update bot. The method 400 can include processing to determine whether an expected folder structure exists and in some cases, creation of subfolders if needed. For example, at 402, a determination is made as to whether a specific purchase order folder exists. At 404, in response to determining that the specific purchase order folder does not exist, an error can be logged and the method can end (although in some implementations, the specific purchase order folder can be created if needed).

At 406, in response to determining that the specific purchase order folder exists, a determination is made as to whether a to-be-processed sub folder exists. At 404, in response to determining that the to-be-processed sub folder does not exist, an error can be logged and the method can end (although in some implementations, the to-be-processed sub folder can be created if needed).

At 408, in response to determining that the to-be-processed sub folder exists, a determination is made as to whether a processed sub folder exists. At 410, in response to determining that the processed sub folder does not exist, the processed sub folder is created.

At 412, in response to determining that the processed sub folder exists (or in response to creation of the processed sub folder), a determination is made as to whether a failed sub folder exists. At 414, in response to determining that the failed sub folder does not exist, the failed sub folder is created.

At 416, in response to determining that the failed sub folder exists (or in response to creation of the failed sub folder), a determination is made as to whether a logs sub folder exists. At 418, in response to determining that the logs sub folder does not exist, the logs sub folder is created.

At 420, in response to determining that the log sub folder exists (or in response to creation of the logs sub folder), a log file is created. The log file can be stored in the logs sub folder.

At 422, the to-be-processed sub folder is evaluated to identify any input (e.g., spreadsheet) files that are to be processed.

At 424, a determination is made as to whether any input files were identified in the to-be-processed folder. At 426, in response to determining that no input files were identified in the to-be-processed folder, a log entry noting that no files were identified can be logged and the method can end.

At 428, in response to determining that at least one input file was identified in the to-be-processed folder, the one or more input files are processed. Processing the one or more input files can include identifying a current input file to process.

At 430, each entry in the current input file is read. If multiple entries are read, a current entry is identified.

At 432, purchase order (PO) data is generated from the current entry. The PO data can be a PO XML (eXtensible Markup Language) document, for example.

At 434, a call is made to an ERP system requesting creation of a purchase order based on the generated PO data. The call can be to a web service of the ERP system, for example.

At 436, a determination is made as to whether the PO was successfully created in the ERP system. For example, a return value from the call to the ERP system can be evaluated.

At 438, in response to determining that the PO was successfully created in the ERP system, a PO number of the created PO (e.g., received as a response to the call to the ERP system) can be stored in the log file. At 440, a determination is made as to whether an input file of the created entry exists in the processed sub folder. At 442, in response to determining that the input file of the created entry does not exist in the processed sub folder, a copy of the input file can be moved to the processed sub folder.

At 444, in response to determining that the PO was not successfully created, an error regarding the failed PO creation can be logged in the log file. At 446, a determination is made as to whether an input file of the failed entry exists in the failed sub folder. At 448, in response to determining that the input file of the failed entry does not exist in the failed sub folder, a copy of the input file can be moved to the failed sub folder.

At 450, a determination is made as to whether a next entry exists in the current input file. If a next entry exists in the current input file, processing (e.g., at steps 430 to 448) can be repeated for the next entry.

At 452, in response to determining that a next entry does not exist in the current input file, a determination can be made as to whether a next input file exists. If a next input file does not exist, the method can end. If a next input file exists, processing for the next input file can be initiated at step 428.

Figure 5:
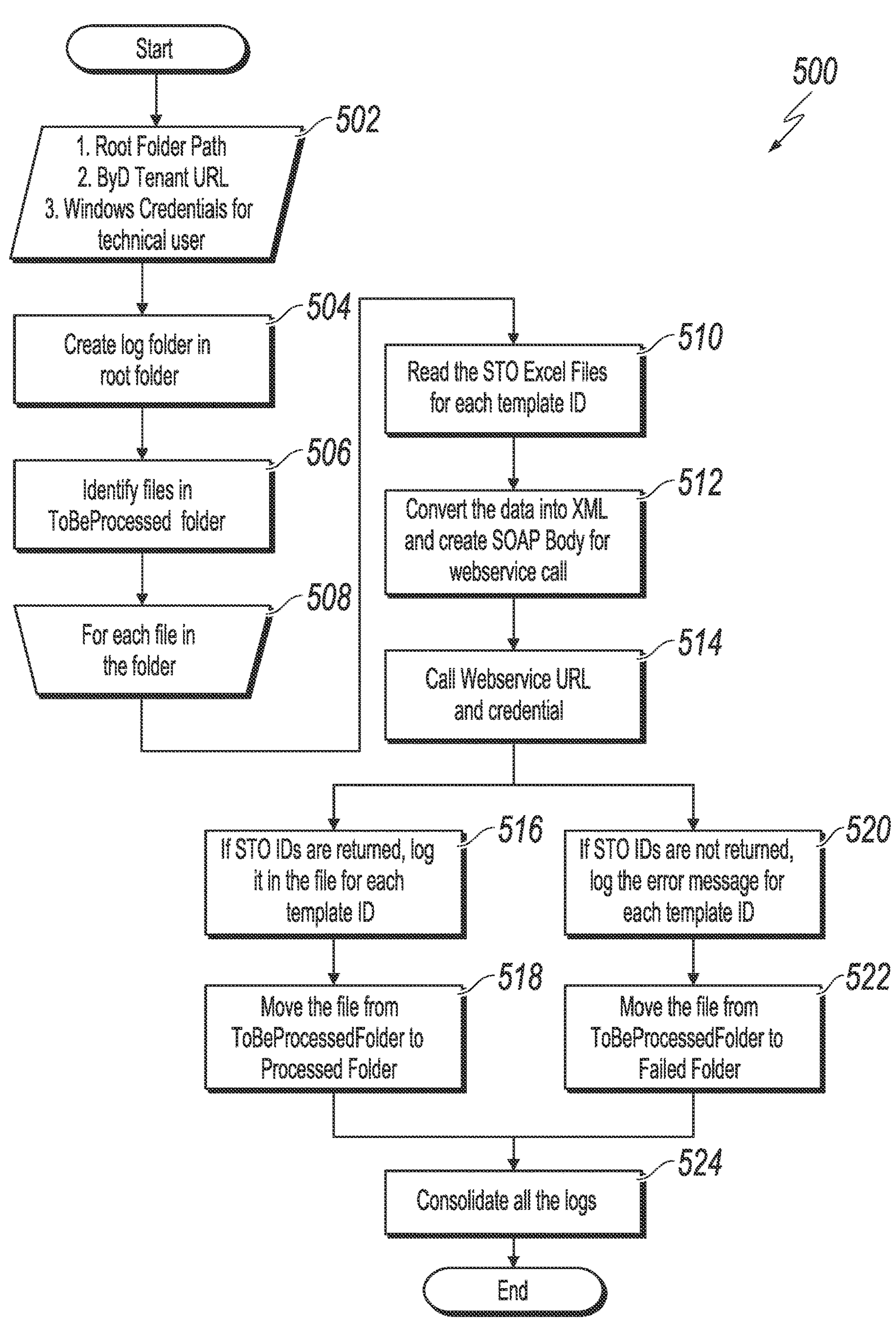
FIG. 5 illustrates an example method that can be performed by an automated stock transfer order bot.

FIG. 5 illustrates an example method 500 that can be performed by an automated stock transfer order bot.

At 502, inputs are received for the method 500. Inputs can include 1) a root folder path of a folder structure used by the method 500, a tenant URL of an ERP tenant, and credentials for a technical user used to make a call to the ERP system.

At 504, a log folder is created in the root folder (e.g., if needed).

At 506, file(s) are identified from a to-be-processed sub folder of the root folder.

At 508, processing is initiated for files in the to-be-processed folder. For example, processing can be performed for each file in the folder.

At 510, STO (Stock Transfer Order) spreadsheet file(s) are read for each template identifier.

At 512, data read from the STO spreadsheet file(s) is converted, for example, to an XML format and included in a body of a call to be made to the ERP system. The call can be a SOAP (Simple Object Access Protocol) call, for example.

At 514, the call to the ERP system is invoked, using the tenant URL and the credentials.

At 516, if STO identifiers of STO objects created in the ERP system are returned, the STO identifiers are logged.

At 518, the STO spreadsheet file is moved the to-be-processed folder to a processed folder.

At 520, if STO identifiers are not returned from the ERP system, an error may have occurred, and an error message is logged.

At 522, the STO spreadsheet file is moved from the to-be-processed folder to a failed folder.

At 524, log consolidation can be performed.

Figure 6:
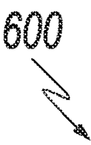
FIG. 6 is a flowchart of an example method for intelligent document processing in enterprise resource planning.
Figure 6:
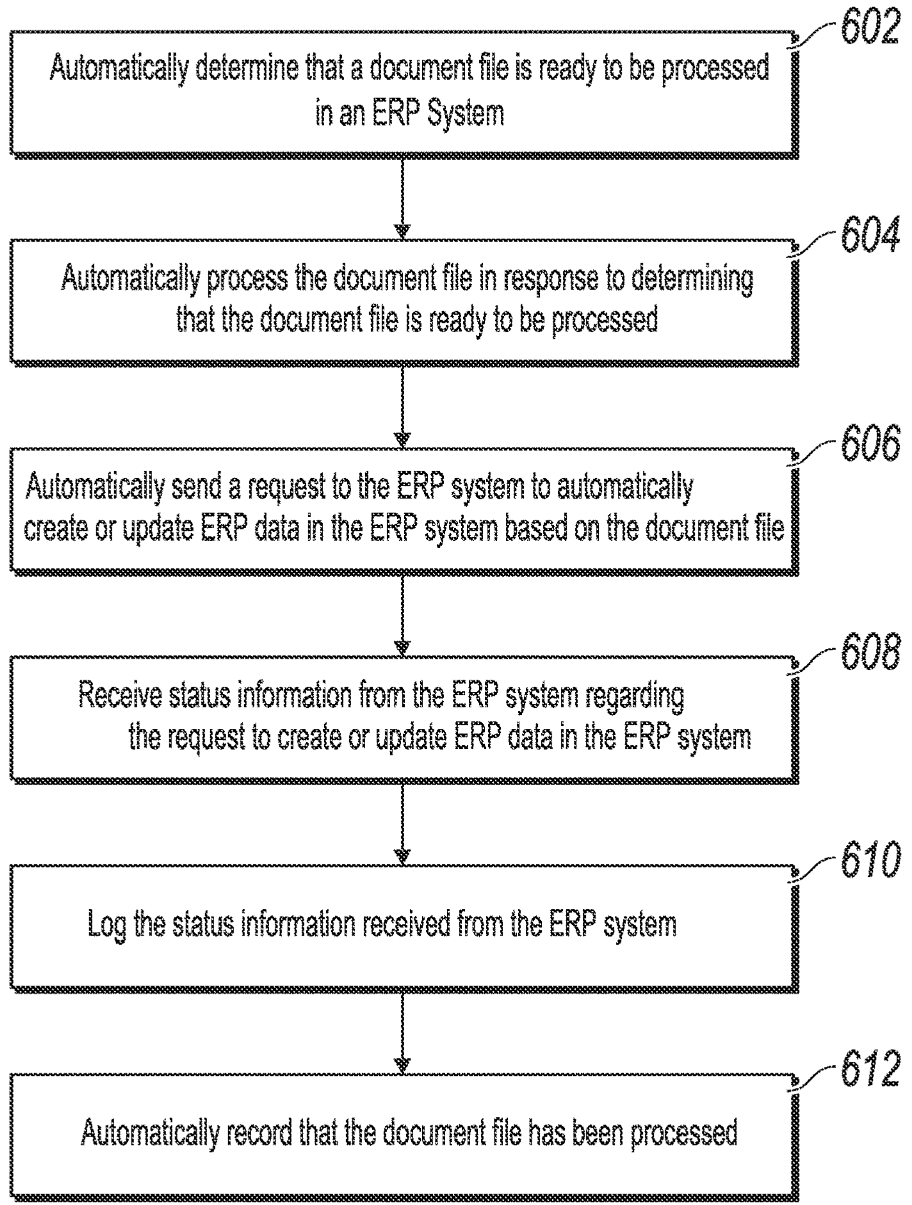

FIG. 6 is a flowchart of an example method for intelligent document processing in enterprise resource planning. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the system 100 described above with respect to FIG. 1. For example, the method 600 and related methods can be executed by the customer device 104 of FIG. 1.

At 602, a determination is automatically made that a document file is ready to be processed in an ERP (Enterprise Resource Planning) system. The document file can be automatically extracted from an email message and placed in a predetermined folder on a client machine. The predetermined folder can correspond to an ERP object type. In some implementations, the predetermined folder can correspond to a company code. The document file can be an invoice, a purchase order, a purchase order template, a stock transfer order template, a proof of delivery document, or some other type of ERP document.

At 604, the document file is automatically processed in response to determining that the document file is ready to be processed in the ERP system. Automatically processing the document file can include extracting information from the document file. The information can be extracted from the document file using one or more machine learning models. Automatically processing the document file can include receiving ERP master data information stored in the ERP system for improving information extraction from the document file.

At 606, a request is automatically sent to an ERP system to automatically create or update ERP data in the ERP system based on the document file. Master data information corresponding to information extracted from the document file can be included in the request. The request can be to create an ERP object in the ERP system using information in the document file. Sending the request can include sending the document file to the ERP system for storage of the document file in the ERP system. The request can be to automatically create a sales order object in the ERP system using information from a received purchase order, automatically create a purchase order object in the ERP system using information from a received purchase order template, automatically create a stock transfer order object in the ERP system using information from a received stock transfer order template, automatically upload a supplier invoice to the ERP system, or automatically upload a proof of delivery note to the ERP system, among other types of requests.

At 608, status information is received from the ERP system regarding the request to create or update ERP data in the ERP system.

At 610, the status information received from the ERP system is logged.

At 612, an indication that the document file has been processed is automatically recorded. The document file can be moved to a processed folder or a failed folder based on the status information. The email messages can be moved to a processed email folder.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for overcoming a field count upload limitation of an upload API (Application Programming Interface) of an ERP (Enterprise Resource Planning) system comprising:

automatically receiving, by a first artificial intelligence (AI) service of an AI system, ERP (Enterprise Resource Planning) master data from an ERP system, wherein the first AI service is included in a set of multiple cooperating AI services of the AI system that each perform a defined service and wherein a field count upload limitation of the upload API of the ERP system comprises a maximum number of fields restriction for an input document of a document upload feature of the ERP system;

automatically providing, by the first AI service, the ERP master data to a machine learning extraction service of the AI system that is trained to generate structured ERP data in different types of standardized machine-readable data-interchange formats from different types of unstructured document data from different types of document files;

receiving, by the machine learning extraction service, the ERP master data;

incorporating, by the machine learning extraction service, the ERP master data into the machine learning extraction service to increase accuracy of unstructured data extraction by the machine learning extraction service;

automatically determining, by a second AI service of the set of cooperating AI services, that a document file is ready to be processed in the ERP system, wherein the document file includes unstructured ERP data in a total number of fields that exceeds the maximum number of fields restriction of the field count upload limitation of the ERP system;

automatically processing the document file in response to determining that the document file is ready to be processed in the ERP system, wherein automatically processing the document file comprises:

sending a request, by a third AI service of the set of cooperating AI services to the machine learning extraction service of the AI system, to extract structured ERP information from the document file;

automatically extracting, by the machine learning extraction service, the unstructured ERP data from each field of the document file, including from fields occurring after a count of fields equal to the maximum number of fields has been processed;

generating, by the machine learning extraction service, structured information in a queryable JSON (JavaScript Object Notation) format from the unstructured ERP data extracted from the document file, wherein the structured information in the queryable JSON format includes ERP object header field information and line item information;

enriching, by the machine learning extraction service, the structured information with received ERP master data that corresponds to the unstructured ERP data automatically extracted from the document file;

providing, by the machine learning extraction service and to the third AI service, enriched structured information; and overcoming the maximum number of fields restriction of the document upload feature of the ERP system by automatically sending, by the third AI service, a request to the ERP system using at least one ERP data creation API that is different from the upload API to automatically create or update ERP data in the ERP system based on information from each field in the document file, wherein the request sent to the ERP system includes the enriched structured information that includes information automatically extracted from the document file that has been structured in the queryable JSON format and enriched with ERP master data;

receiving, by the third AI service, status information from the ERP system regarding the request to create or update ERP data in the ERP system;

logging, by the third AI service, the status information received from the ERP system; and automatically recording, by the third AI service, that the document file has been processed in the ERP system.

2. The computer-implemented method of claim 1, wherein the document file is automatically extracted from an email message and placed in a predetermined folder on a client machine.

3. The computer-implemented method of claim 2, wherein automatically recording that the document file has been processed in the ERP system comprises automatically recording that the email message has been processed.

4. The computer-implemented method of claim 2, wherein the predetermined folder corresponds to an ERP object type.

5. The computer-implemented method of claim 1, wherein the request sent to the ERP system is to create or update an ERP object in the ERP system using information from the document file.

6. The computer-implemented method of claim 1, wherein sending the request to the ERP system includes sending the document file to the ERP system for storage of the document file in the ERP system.

7. The computer-implemented method of claim 1, wherein the request is to automatically create a sales order object in the ERP system using information from a received customer purchase order document.

8. The computer-implemented method of claim 1, wherein the request is to automatically create a purchase order object in the ERP system using information from a received purchase order template.

9. The computer-implemented method of claim 1, wherein the request is to automatically create a stock transfer order object in the ERP system using information from a received stock transfer order template.

10. The computer-implemented method of claim 1, wherein the request is to automatically create or upload a supplier invoice to the ERP system.

11. The computer-implemented method of claim 1, wherein the request is to automatically upload a proof of delivery note to the ERP system.

12. The computer-implemented method of claim 1, wherein the request is to automatically create an expense line item in the ERP system based on a travel receipt.

13. The computer-implemented method of claim 1, wherein the request is to automatically create a contact or lead in the ERP system based on a business card.

14. The computer-implemented method of claim 1, wherein the document file is photographed using a mobile application and sent to the ERP system for processing.

15. The computer-implemented method of claim 1, wherein the machine learning extraction service is trained to identify and extract information from different types of documents that include data for different types of ERP objects.

16. The computer-implemented method of claim 1, wherein the request to the ERP system to automatically create or update ERP data is sent with a request to associate a created ERP object with an existing ERP object in the ERP system.

17. The computer-implemented method of claim 1, wherein:

the second AI service automatically determines that the document file is ready to be processed based on determining that the document file is located in a folder associated with a first type of ERP object;

the third AI service is configured to send requests to the ERP system for the first type of ERP object; and the set of cooperating AI services includes other AI services configured to send requests to the ERP system for other types of ERP objects other than the first type of ERP object.

18. A computer-implemented system for overcoming a field count upload limitation of an ERP (Enterprise Resource Planning) system comprising:

one or more computers; and a computer-readable medium coupled to the one or more computers having instructions stored thereon which, when executed by the one or more computers, cause the one or more computers to perform operations comprising:

automatically receiving, by a first artificial intelligence (AI) service of an AI system, ERP (Enterprise Resource Planning) master data from an ERP system, wherein the first AI service is included in a set of multiple cooperating AI services of the AI system that each perform a defined service and wherein a field count upload limitation of an upload API of the ERP system comprises a maximum number of fields restriction for an input document of a document upload feature of the ERP system;

automatically providing, by the first AI service, the ERP master data to a machine learning extraction service of the AI system that is trained to generate structured ERP data in different types of standardized machine-readable data-interchange formats from different types of unstructured document data from different types of document files;

receiving, by the machine learning extraction service, the ERP master data;

incorporating, by the machine learning extraction service, the ERP master data into the machine learning extraction service to increase accuracy of unstructured data extraction by the machine learning extraction service;

automatically determining, by a second AI service of the set of cooperating AI services, that a document file is ready to be processed in the ERP system, wherein the document file includes unstructured ERP data in a total number of fields that exceeds the maximum number of fields restriction of the field count upload limitation of the ERP system;

automatically processing the document file in response to determining that the document file is ready to be processed in the ERP system, wherein automatically processing the document file comprises:

sending a request, by a third AI service of the set of cooperating AI services to the machine learning extraction service of the AI system, to extract structured ERP information from the document file;

automatically extracting, by the machine learning extraction service, the unstructured ERP data from each field of the document file, including from fields occurring after a count of fields equal to the maximum number of fields has been processed;

generating, by the machine learning extraction service, structured information in an extensible Markup Language (XML) format from the unstructured ERP data extracted from the document file;

enriching, by the machine learning extraction service, the structured information with received ERP master data that corresponds to the unstructured ERP data automatically extracted from the document file;

providing, by the machine learning extraction service and to the third AI service, enriched structured information; and overcoming the maximum number of fields restriction of the document upload feature of the ERP system by automatically sending, by the third AI service, a request to the ERP system using at least one ERP data creation API that is different from the upload API to automatically create or update ERP data in the ERP system based on information from each field in the document file, wherein the request sent to the ERP system includes the enriched structured information that includes information automatically extracted from the document file that has been structured in the XML format and enriched with ERP master data, wherein the at least one ERP data creation API comprises a SOAP (Simple Object Access Protocol) API;

receiving, by the third AI service, status information from the ERP system regarding the request to create or update ERP data in the ERP system, wherein the status information includes ERP object identifiers of objects created or updated in the ERP system in response to the request to create or update ERP data;

logging, by the third AI service, the status information received from the ERP system; and automatically recording, by the third AI service, that the document file has been processed in the ERP system.

19. The system of claim 18, wherein the document file is automatically extracted from an email message and placed in a predetermined folder on a client machine.

20. A computer program product encoded on a non-transitory storage medium, the product comprising non-transitory, computer readable instructions for causing one or more processors to perform operations comprising:

automatically receiving, by a first artificial intelligence (AI) service of an AI system, ERP (Enterprise Resource Planning) master data from an ERP system, wherein the first AI service is included in a set of multiple cooperating AI services of the AI system that each perform a defined service and wherein a field count upload limitation of an upload API of the ERP system comprises a maximum number of fields restriction for an input document of a document upload feature of the ERP system;

automatically providing, by the first AI service, the ERP master data to a machine learning extraction service of the AI system that is trained to generate structured ERP data in different types of standardized machine-readable data-interchange formats from different types of unstructured document data from different types of document files;

receiving, by the machine learning extraction service, the ERP master data;

incorporating, by the machine learning extraction service, the ERP master data into the machine learning extraction service to increase accuracy of unstructured data extraction by the machine learning extraction service;

automatically determining, by a second AI service of the set of cooperating AI services, that a document file is ready to be processed in the ERP system, wherein the document file includes unstructured ERP data in a total number of fields that exceeds the maximum number of fields restriction of the field count upload limitation of the ERP system;

automatically processing the document file in response to determining that the document file is ready to be processed in the ERP system, wherein automatically processing the document file comprises:

sending a request, by a third AI service of the set of cooperating AI services to the machine learning extraction service of the AI system, to extract structured ERP information from the document file;

automatically extracting, by the machine learning extraction service, the unstructured ERP data from each field of the document file, including from fields occurring after a count of fields equal to the maximum number of fields has been processed;

generating, by the machine learning extraction service, structured information in a queryable JSON (JavaScript Object Notation) format from the unstructured ERP data extracted from the document file, wherein the structured information in the queryable JSON format includes ERP object header field information and line item information;

enriching, by the machine learning extraction service, the structured information with received ERP master data that corresponds to the unstructured ERP data automatically extracted from the document file;

providing, by the machine learning extraction service and to the third AI service, enriched structured information; and overcoming the maximum number of fields restriction of the document upload feature of the ERP system by automatically sending, by the third AI service, a request to the ERP system using at least one ERP data creation API that is different from the upload API to automatically create or update ERP data in the ERP system based on information from each field in the document file, wherein the request sent to the ERP system includes the enriched structured information that includes information automatically extracted from the document file that has been structured in the queryable JSON format and enriched with ERP master data;

receiving, by the third AI service, status information from the ERP system regarding the request to create or update ERP data in the ERP system;

logging, by the third AI service, the status information received from the ERP system; and automatically recording, by the third AI service, that the document file has been processed in the ERP system.

* * * * *